United States Patent
Rawat et al.

(10) Patent No.: US 11,074,676 B2
(45) Date of Patent: Jul. 27, 2021

(54) CORRECTION OF MISALIGNED EYES IN IMAGES

(71) Applicant: Adobe Inc., San Jose, CA (US)

(72) Inventors: Sunil Rawat, Haryana (IN); Rishu Aggarwal, Delhi (IN); Ajay Bedi, Himachal Pradesh (IN)

(73) Assignee: Adobe Inc., San Jose, CA (US)

( * ) Notice: Subject to any disclaimer, the term of this patent is extended or adjusted under 35 U.S.C. 154(b) by 153 days.

(21) Appl. No.: 16/548,021

(22) Filed: Aug. 22, 2019

(65) Prior Publication Data

US 2021/0056667 A1 Feb. 25, 2021

(51) Int. Cl.
*G06K 9/00* (2006.01)
*G06T 5/00* (2006.01)
*G06T 7/73* (2017.01)
*G06T 7/13* (2017.01)

(52) U.S. Cl.
CPC .......... *G06T 5/005* (2013.01); *G06K 9/00281* (2013.01); *G06T 7/13* (2017.01); *G06T 7/74* (2017.01); *G06T 2207/20021* (2013.01); *G06T 2207/30201* (2013.01)

(58) Field of Classification Search
CPC .. G06T 5/005; G06T 7/74; G06T 7/13; G06T 2207/20021; G06T 2207/30201; G06K 9/00281
USPC ........................................................ 382/199
See application file for complete search history.

(56) References Cited

U.S. PATENT DOCUMENTS

| | | | | |
|---|---|---|---|---|
| 6,095,989 A * | 8/2000 | Hay | ...................... | A61B 3/0025 600/558 |
| 6,980,691 B2 * | 12/2005 | Nesterov | .............. | G06K 9/0061 382/103 |
| 8,331,666 B2 * | 12/2012 | Levy | ........................ | G06T 7/90 382/167 |
| 8,520,089 B2 * | 8/2013 | Ciuc | .................... | G06K 9/0061 348/222.1 |
| 9,053,524 B2 * | 6/2015 | Florea | ..................... | G06T 7/181 |
| 9,542,599 B2 * | 1/2017 | Matsunaga | .......... | G06K 9/0061 |
| 9,710,707 B1 * | 7/2017 | Mayer | ........................ | G06T 7/74 |
| 10,089,525 B1 * | 10/2018 | Mayer | .................. | G06K 9/0061 |
| 10,466,778 B2 * | 11/2019 | Kaehler | ............. | G06K 9/00335 |
| 10,580,133 B2 * | 3/2020 | Krishna | .................... | G06T 7/60 |
| 10,664,699 B2 * | 5/2020 | Invernizzi | ................. | G06T 7/80 |

(Continued)

OTHER PUBLICATIONS

PiXimperfect, How to Fix Crossed Eyes in Photoshop, Jan. 6, 2018, [online; Youtube video], https://www.youtube.com/watch?v=QwUouxSjlf4 (Year: 2018).*

(Continued)

*Primary Examiner* — Jonathan S Lee
(74) *Attorney, Agent, or Firm* — Nicholson De Vos Webster & Elliott LLP

(57) ABSTRACT

An eye correction system and related techniques are described herein. The eye correction system can automatically detect and correct one or more misaligned eyes in an image. For example, an image of a person can be analyzed to determine whether one or both eyes of the person are misaligned with respect to each other and/or with respect to the entire face of the person. If an eye is determined to be misaligned, the image can be modified so that the eye is adjusted accordingly. For example, an iris of a misaligned eye can be adjusted to align with the face and/or the other eye.

20 Claims, 13 Drawing Sheets

(56) References Cited

U.S. PATENT DOCUMENTS 10,849,492 B2 * 12/2020 Tomasi ................. G06K 9/209
10,936,178 B2 *  3/2021 Desmond ............. G06F 3/0482

OTHER PUBLICATIONS

Lim, Han Woong, et al. "Quantitative measurement of the angle of ocular movements in patients with horizontal strabismus." Investigative Ophthalmology & Visual Science 56.7 (2015): 5223-5223. (Year: 2015).*

* cited by examiner

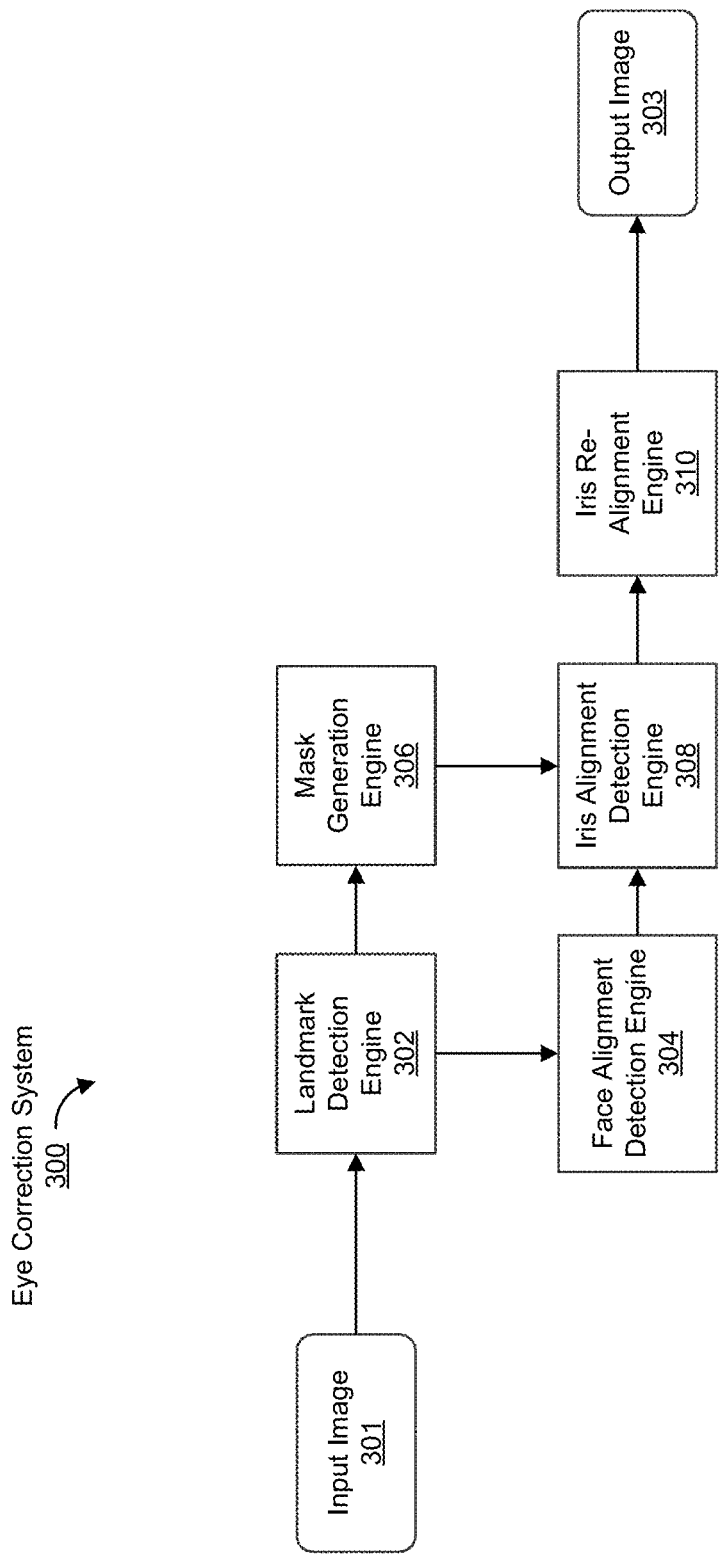

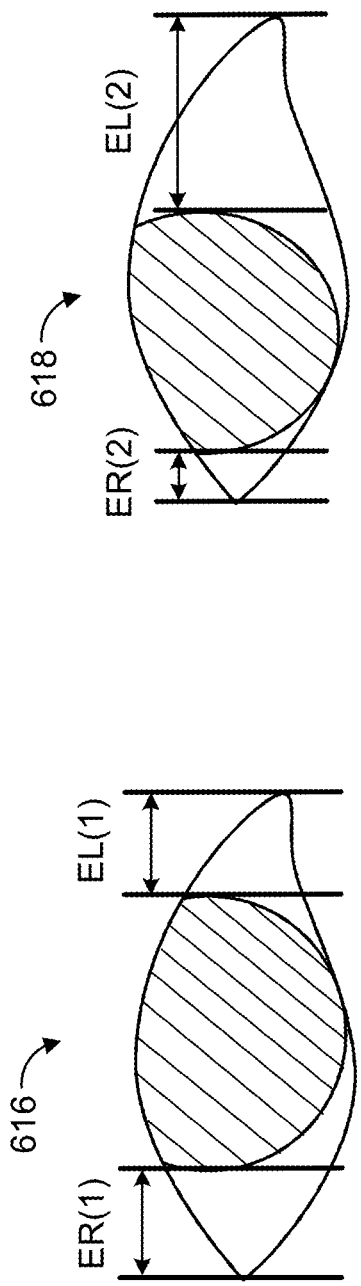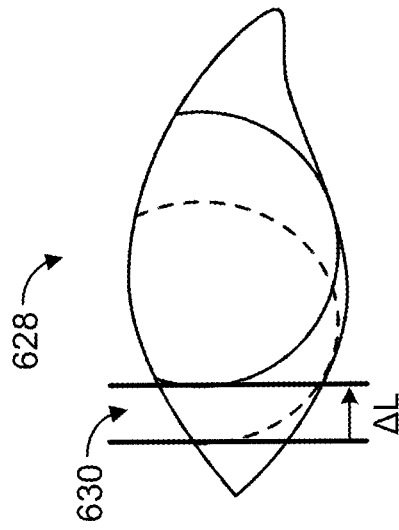

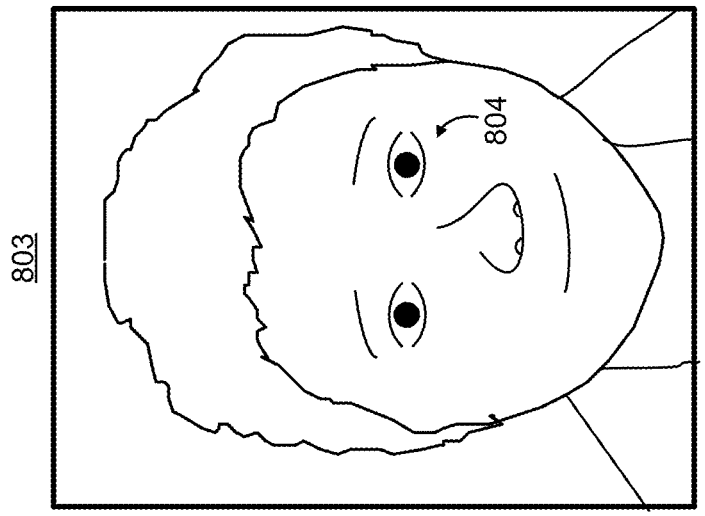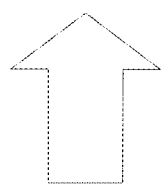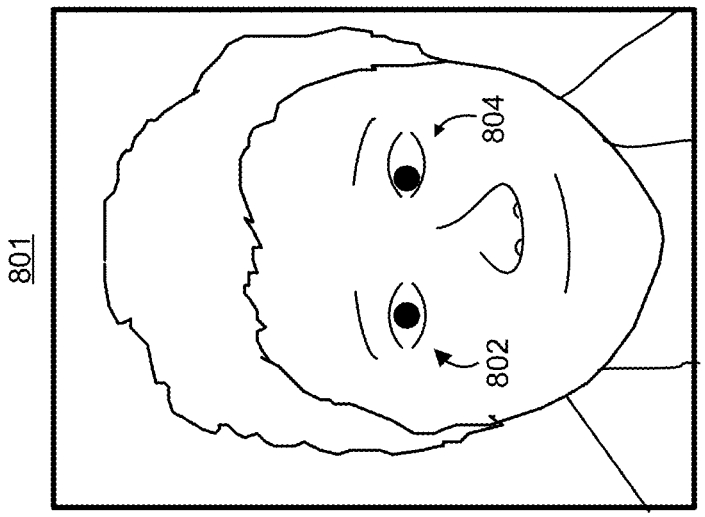
FIG. 8

CORRECTION OF MISALIGNED EYES IN IMAGES

FIELD

This application is related to detecting and correcting misaligned eyes in one or more images.

BACKGROUND

Misaligned eyes can occur in images in various scenarios. For example, misaligned eyes can occur in an image when a person's eyes are not aligned properly with respect to each other (e.g., the irises and pupils of the eyes are not aligned) as the image is captured. Such situations arise, for example, when the eyes are crossed and/or squinted. In another example, misaligned eyes can occur in an image when a person's eyes are not aligned properly with respect to the entire face as the image is captured, resulting in the user's eyes being focused away from the camera capturing the image. This scenario can happen, for instance, when a person looks away from the camera as a photograph is captured.

Computing devices (e.g., smart phones, tablet computers, etc.) and software applications can be used for editing photographs. For example, applications can offer various photograph enhancement operations, such as red eye correction, closed eye correction, spot healing, cloning, shadow highlighting, improving brightness, lighting, contrast, saturation, and other characteristics, among others. However, there lacks a mechanism for automatically identifying and fixing one or more misaligned eyes in an image.

SUMMARY

Systems and related techniques are described herein for automatically detecting and fixing one or more misaligned eyes in one or more images. For example, an image of a person can be obtained, and can be analyzed to determine whether the eyes of the person are misaligned with respect to each other or with respect to the entire face of the person. In some implementations, misaligned eyes can be detected in the image by determining where the iris of each eye is located in the image, and determining the alignment of each iris with respect to the entire face and/or with respect to the other iris.

If the eyes are determined to be misaligned, the image can be modified so that one or more of the eyes are adjusted accordingly. For example, if one of the eyes is determined to be misaligned with respect to both the other eye and the face, the iris of the misaligned eye can be adjusted to align with the face and/or the other eye. In another example, if both of the eyes are determined to be aligned with respect to each other, but are determined to be misaligned with respect to the face, both eyes can be adjusted to align with the face. In some examples, alignment (or misalignment) of an eye (or iris of the eye) can be determined based on an iris position ratio and/or based on a face alignment ratio, as described in more detail herein.

In some cases, the techniques can be performed based on a single click of a graphical interface element of an application (e.g., a mobile application of a mobile device or a desktop application of a desktop computer). In some cases, the techniques can be performed using a post-processing application during post-editing of an image.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing:

FIG. 3 is a block diagram illustrating an example of an eye correction system, in accordance with some examples provided herein;

FIG. 7A and FIG. 7B are diagrams illustrating examples of iris alignments of left and right eyes, in accordance with some examples provided herein;

FIG. 7C is a diagram illustrating an example of an adjustment of an iris, in accordance with some examples provided herein;

FIG. 8 are images illustrating a result of applying eye correction to an image of a person with one eye looking in a different direction than another eye, in accordance with some examples provided herein;

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Figure 1:
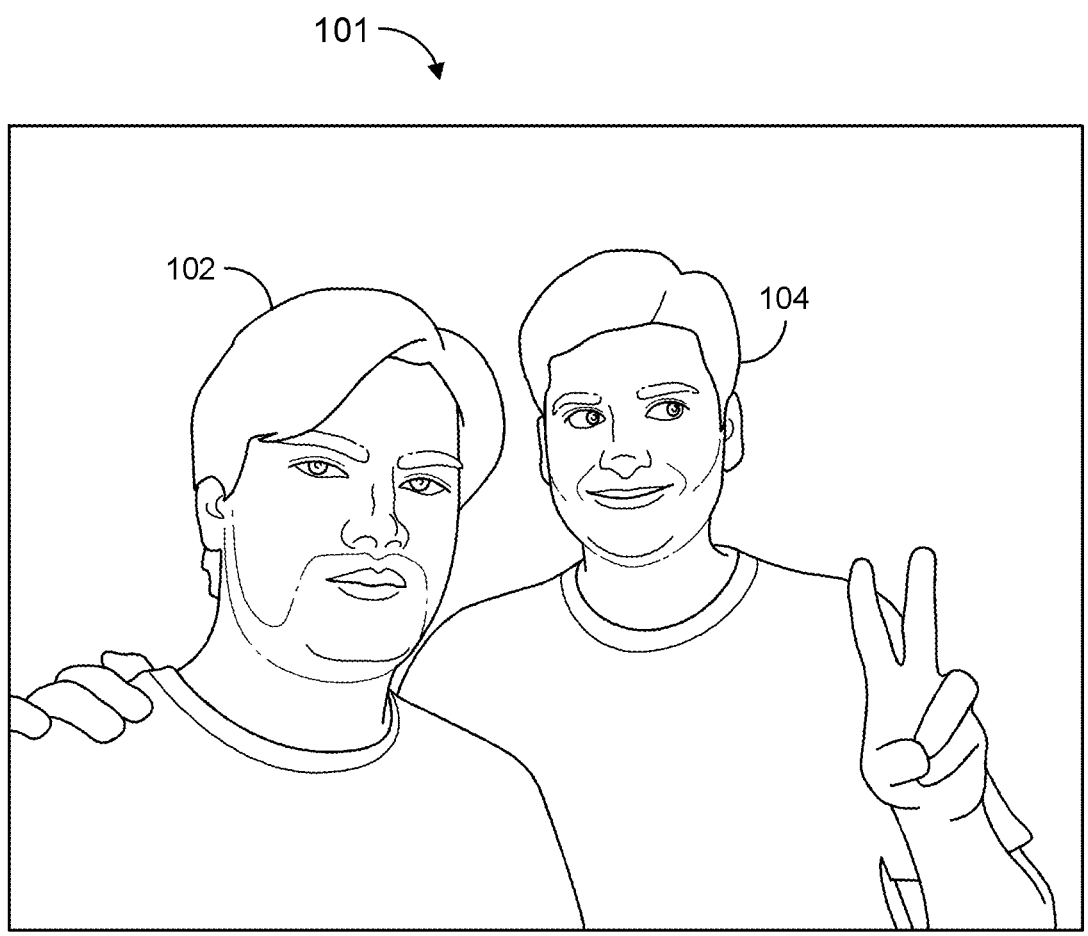
FIG. 1 is an image of a person looking away from a camera as a photograph is captured.

Misaligned eyes can occur in images in various scenarios. FIG. 1 is an image 101 illustrating an example of misaligned eyes that can occur when a person's eyes are not aligned properly with respect to the entire face as the image is captured. As shown in FIG. 1, the person 102 is looking at the camera as the image 101 is captured. However, the person 104 is looking away from the camera when the image 101 is captured, resulting in the eyes of the person 104 being focused away from the camera capturing the image 100. As can be seen, the irises and pupils of the eyes of the person 104 are misaligned with respect to the person's face. The face is pointed at the camera, while the irises and pupils are pointed away from the camera.

The situation illustrated in FIG. 1 can occur in group photographs (a photograph taken of multiple people), where every person in the group may not be sure of the moment when the shutter button will actually be activated to capture the photograph. As a result, one or more of the people in the photograph can have misaligned eyes, in which case the irises of the one or more people are misaligned with respect to their respective face.

Figure 2:
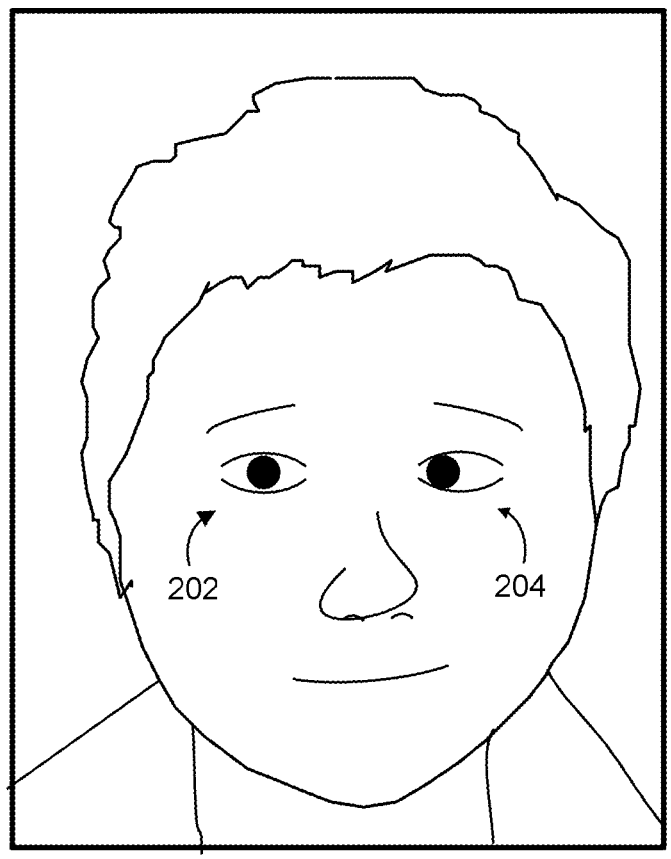
FIG. 2 is an image of a person with one eye looking in a different direction than another eye.

FIG. 2 is an image 201 illustrating another example of misaligned eyes that can occur when a person's eyes are not aligned properly with respect to each other. As shown, the person's right eye 202 is in alignment with the face, while the left eye 204 is misaligned with respect to the right eye 202 and the face. In particular, the iris and pupil of the right eye 202 is aligned with the face, but the pupil and iris of the left eye 204 is not aligned with the face. The scenario illustrated in FIG. 2 can arise, for example, when the eyes are crossed and/or squinted. Strabismus or tropia (referred to herein as a crossed eye) is a medical condition in which both of a person's eyes do not look at the same place at the same time.

Software applications are available for editing photographs. For example, a mobile application running on a mobile device (e.g., a mobile phone, a tablet computer, or other mobile device) can be used to quickly edit photographs. In another example, an application running on a laptop computer and/or desktop computer can provide photograph editing capabilities. Such software applications can be used to perform various functions to improve image properties, including red eye correction to remove redness from a person's pupils, closed eye correction to open a person's eyes when closed in an image, spot healing to remove unwanted spots from an image (e.g., from a person's face), cloning to replicate or remove objects in an image, shadow highlighting, brightness adjustment, adding or removing lighting, adjusting contrast, saturation, and/or other characteristics, among others functions. However, there does not exist any software application or other mechanism for automatically identifying and fixing one or more misaligned eyes in an image, such as those shown in FIG. 1 and FIG. 2. A software tool with the ability to quickly and easily fix photographs that include people with misaligned eyes would be a great benefit in many situations.

Systems, methods, and computer-readable media are described herein for automatically detecting and fixing one or more misaligned eyes in one or more images. For instance, an image of one or more people can be obtained, and can be analyzed to determine whether the eyes of each person are misaligned with respect to each other or with respect to the entire face of the person. As described in more detail below, misaligned eyes can be detected by determining where the iris of each eye is located in the image (e.g., based on the iris boundary of each eye) and the alignment of each iris with respect to the face alignment and/or with respect to the alignment of the other iris. If one or more eyes of a person are determined to be misaligned, the image can be modified to adjust the iris of each misaligned eye with respect to the alignment of the entire face and/or with respect to the alignment of the other iris. While the techniques are described herein with reference to the iris, it will be understood that the pupil within the iris will also be adjusted with the iris.

FIG. 3 is a block diagram illustrating an example of an eye correction system 300. The eye correction system 300 includes various components, including a landmark detection engine 302, a face alignment detection engine 304, a mask generation engine 306, an iris alignment detection engine 308, and an iris re-alignment engine 310. The components of the eye correction system 300 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the eye correction system 300 is shown to include certain components, one of ordinary skill will appreciate that the eye correction system 300 can include more or fewer components than those shown in FIG. 3. For example, the eye correction system 300 can also include, or can be part of a computing device that includes, an input device and an output device (not shown). In some implementations, the eye correction system 300 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 3.

In some implementations, the eye correction system 300 can be implemented locally by and/or included in a computing device. For example, the computing device can include a mobile device, a personal computer, a tablet computer, a wearable device, a server (e.g., in a software as a service (SaaS) system or other server-based system), and/or any other computing device with the resource capabilities to perform the techniques described herein. In some examples, the eye correction system 300 can be implemented by a client-server system.

The eye correction system 300 can be integrated with (e.g., integrated into the software, added as a plug-in, or otherwise integrated with) a software application, such as an image or photograph capture and/or editing application (e.g., Adobe Photoshop™, Adobe Lightroom™, among others), a social networking application (e.g., Instagram™, Facebook™, Pinterest™ Snapchat™, among others), a real estate application (e.g., Redfin™, Zillow™, among others), or any other application that incorporates the use of images. The software application can be a mobile application installed on a mobile device (e.g., a mobile phone, such as a smartphone, a tablet computer, a wearable device, or other mobile device), a desktop application installed on a desktop computer, or other software application.

In some cases, the eye correction system 300 can perform the processes described below in response to an input received by the eye correction system 300. For instance, the input can be based on a user input provided to a software application including the eye correction system 300. In some examples, the software application can have a single-click option (e.g., shown as an icon or other graphical element on the graphical user interface (GUI) of the software application that a user can select) that, when selected, causes the eye correction system 300 to process an input image. For instance, in response to a user selection of the single-click option, the eye correction system 300 can process an input image to correct any misaligned eyes that may be present. In some examples, the eye correction system 300 can perform the processes described herein during post-editing of an image (e.g., using a post-processing application, such as Adobe Photoshop™ and/or Lightroom™). In some examples, the eye correction system 300 can perform the processes described herein automatically as images are captured by a camera.

One or more input images (e.g., input image 301) are used as input by the eye correction system 300. An input image can include a photograph captured by a camera, a frame of a video captured by a camera, a full video sequence (including all video frames of a video), or other suitable type of image. For example, in some cases, the eye correction system 300 can operate on a single image or video frame and can correct any misaligned eyes detected in the image or video frame. In another example, the eye correction system 300 can process on all frames of a video to correct alignment throughout the video. The one or more input images include at least one person and/or other object with at least one eye visible in the one or more input images. While examples will be described herein using eye correction of people, one of ordinary skill will appreciate that the eye correction techniques can also be applied to animals, machines (e.g., robots), or other objects with eyes. In some cases, the eye correction techniques can be used to correct alignment of objects other than eyes, such as alignment of glasses on a person's face, alignment of one or more paintings hung on a wall, or other misaligned object(s).

The landmark detection engine 302 can process the one or more input images, including the input image 301. For instance, the landmark detection engine 302 can process the input image 301 to detect one or more faces using face detection and to compute facial landmarks for each of the detected faces. In one illustrative example, referring to FIG. 1, the landmark detection engine 302 can process the image 101 (as an input image) and can detect the face of the person 102 and the face of the person 104. In another illustrative example, referring to FIG. 2, the landmark detection engine 302 can process the image 201 and can detect the face of the person shown in the image 201. A facial landmark can include a feature (e.g., a part of an eye) or a group of features of a face.

Any suitable face detection and/or facial landmark detection techniques or algorithms can be performed by the landmark detection engine 302 to locate the one or more faces in the image 301 and to detect facial features that can be used as the facial landmarks. For example, the landmark detection engine 302 can perform face detection to determine where in the image a face is located (e.g., identified using a bounding region, such as a bounding box, around the face), and can perform facial landmark detection to determine facial landmarks of a detected face. One illustrative example of a facial feature detection library that can be used is Dlib library, which can be integrated in the software code of an application by including the header files of the Dlib library. Another illustrative example of a facial feature detection library is the Cambridge Face Tracker (also referred to as CLM-Framework). Any other suitable face detection and landmark detection algorithm can be used.

Figure 4A:
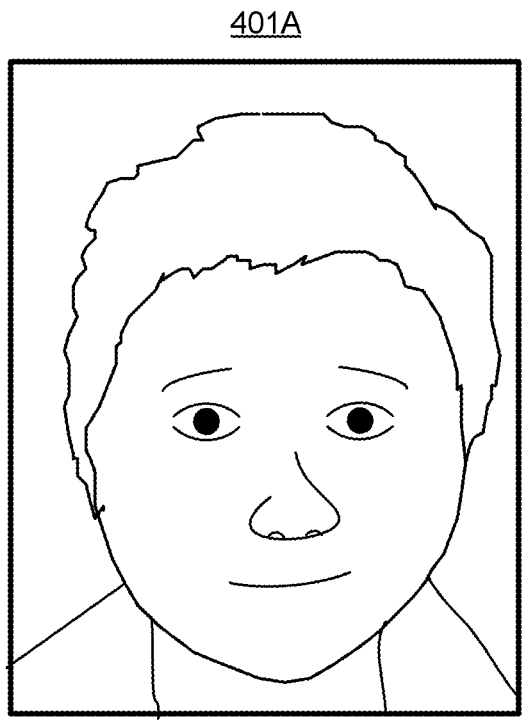
FIG. 4A illustrates an image of a face, in accordance with some examples provided herein.
Figure 4B:
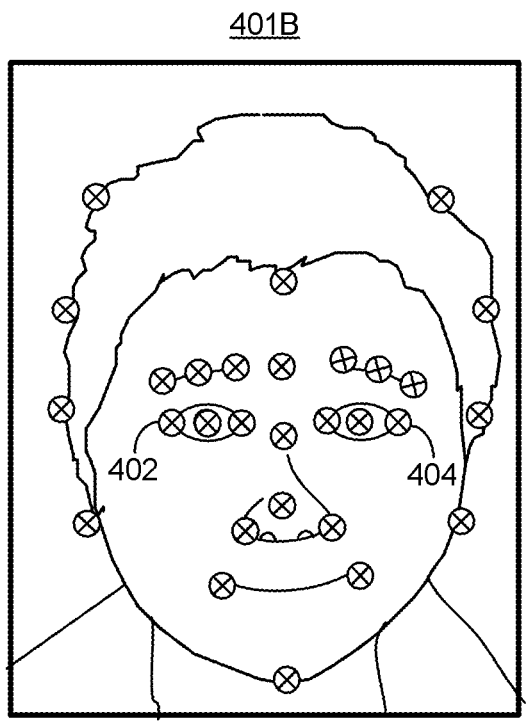
FIG. 4B illustrates identification of facial landmark features on the face depicted in the image of FIG. 4A, in accordance with some examples provided herein.
Figure 4C:
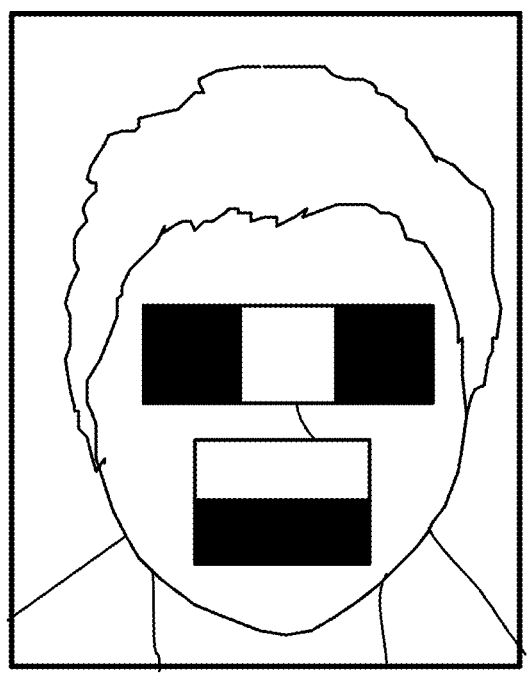
FIG. 4C illustrates identification of Haar features on the face depicted in the image of FIG. 4A, in accordance with some examples provided herein.

FIG. 4A-FIG. 4C are images illustrating identification of features (facial landmarks) within a face in an image. In the context of landmark detection, the features illustrated in FIG. 4A-FIG. 4C are facial landmarks. In particular, image 401A of FIG. 4A includes a face of a person. The image 401B of FIG. 4B is the image 410A, but with circled "x" markings at different point-based facial landmarks. The facial landmarks in FIG. 4B include a facial landmark 402 for the outside corner of the right eye, a facial landmark 402 for the outside corner of the left eye, and other facial features including the irises of the two eyes of the face, a tip of the nose, each side or nostril of the nose, each corner of the mouth, the tip of the chin, the center of the forehead, among others. The image 401C of FIG. 4C is the image 401A, but with Haar features (described below), in which average pixel values for regions of the face indicate that the regions for each eye and the mouth are darker, while the regions for the nose bridge, nose tip, and each cheek are brighter.

As noted above, the landmark detection engine 302 can perform face detection to locate a face in the input image 301, and can detect facial landmarks by performing facial landmark detection on the face. An illustrative example of face detection and landmark detection will now be described with reference to FIG. 4A-FIG. 4C. However, one of ordinary skill will appreciate that any type of face detection and landmark detection can be used by the landmark detection engine 302. Object detection in general is a technology used to detect (or locate) objects from an image or video frame. Detected objects can be represented using bounding regions that identify the location and/or approximate boundaries of the object (e.g., a face) in the image or video frame. A bounding region of a detected object can include a bounding box, a bounding circle, a bounding ellipse, or any other suitably-shaped region representing a detected object.

In some cases, object detection algorithms (including face detection algorithms) can use template matching techniques to locate objects (e.g., faces) from the images. Various types of template matching algorithms can be used. One example of a template matching algorithm can perform Haar or Haar-like feature extraction, integral image generation, Adaboost training, and cascaded classifiers. Such an object detection technique performs detection by applying a sliding window (e.g., having a rectangular, circular, triangular, or other shape) across a frame or image. An integral image may be computed to be an image representation evaluating particular regional features, for example rectangular or circular features, from an image.

For each current window, the Haar features of the current window can be computed from the integral image noted above, which can be computed before computing the Haar features. As noted above, an example of Haar features is illustrated in image 401C of FIG. 11C. The Harr features can be computed by calculating sums of image pixels within particular feature regions of the object image, such as those of the integral image. In faces, for example, a region with an eye is typically darker than a region with a nose bridge or cheeks. The Haar features can be selected by a learning algorithm (e.g., an Adaboost learning algorithm) that selects the best features and/or trains classifiers that use them, and can be used to classify a window as a face (or other object) window or a non-face window effectively with a cascaded classifier. A cascaded classifier includes multiple classifiers combined in a cascade, which allows background regions of the image to be quickly discarded while performing more computation on object-like regions. For example, the cascaded classifier can classify a current window into a face category or a non-face category. If one classifier classifies a window as a non-face category, the window is discarded. Otherwise, if one classifier classifies a window as a face category, a next classifier in the cascaded arrangement will be used to test again. Until all the classifiers determine the current window is a face (or other object), the window will be labeled as a candidate for being a face (or other object). After all the windows are detected, a non-max suppression algorithm can be used to group the face windows around each face to generate the final result of detected faces.

Other suitable object detection techniques can also be performed by the object detection engine 210, such as those using the Dlib library and/or the CLM-Framework library. One other illustrative example of an object detection technique includes example-based learning for view-based face detection, such as that described in K. Sung and T. Poggio, "Example-based learning for view-based face detection," IEEE Patt. Anal. Mach. Intell., volume 20, pages 39-51, 1998, which is hereby incorporated by reference, in its entirety and for all purposes. Another example is neural network-based object detection, such as that described in H. Rowley, S. Baluja, and T. Kanade, "Neural network-based face detection," IEEE Patt. Anal. Mach. Intell., volume 20, pages 22-38, 1998, which is hereby incorporated by reference, in its entirety and for all purposes. Yet another example is statistical-based object detection, such as that described in H. Schneiderman and T. Kanade, "A statistical method for 3D object detection applied to faces and cars," International Conference on Computer Vision, 2000, which is hereby incorporated by reference, in its entirety and for all purposes. Another example is a snowbased object detector, such as that described in D. Roth, M. Yang, and N. Ahuja, "A snowbased face detector," Neural Information Processing 12, 2000, which is hereby incorporated by reference, in its entirety and for all purposes. Another example is a joint induction object detection technique, such as that described in Y. Amit, D. Geman, and K. Wilder, "Joint induction of shape features and tree classifiers," 1997, which is hereby incorporated by reference, in its entirety and for all purposes. Any other suitable image-based object detection techniques can be used.

The landmark detection engine 302 can also perform facial landmark detection to detect facial landmarks of each face detected in the input image 301. One illustrative example of landmark detection is based on a cascade of regressors method. For example, a cascade of regressors can be trained (or learned) from faces with labeled landmarks. A combination of the outputs from the cascade of the regressors provides an accurate estimation of landmark locations. The local distribution of features around each landmark can be learned and the regressors will give the most probable displacement of the landmark from the previous regressor's estimate. In some cases, the landmark detection engine 302 may start with a loose template of where certain landmark features are expected to be found based on the type of object (e.g., a face). Such a template for a face might identify general regions in which eyes and/or a nose and/or a mouth and/or ears might be expected in similar manners to those illustrated in FIG. 11A-FIG. 11C. Any other suitable landmark detection techniques can also be used by the landmark detection engine 302.

In some cases, the face detection and facial landmark data from the landmark detection engine 302 can be stored using the following data structure (CLPSFaceData):

```
struct CLPSFaceData
{
    CRectL fFaceRect;
    CRectL fImageBounds;
    float64 fConfidence;
    std::vector fLandmarks;
};
```

A CLPSFaceData face data structure can be stored for each face detected in the image 301. The term fFaceRect is the bounding rectangle of a face, which can include two or more points of the bounding rectangle (e.g., the top left corner of the bounding rectangle, and the bottom right corner of the bounding rectangle). The fImageBounds include the boundaries of the image, such as a value of (0,0) for the top left corner and a value for the bottom right corner that depends on the resolution or size of the image. The fConfidence is the confidence score, indicating how confident the landmark detection engine 302 is in categorizing the object as a face (e.g., a value between 0 and 1). If the fConfidence value is more than a confidence threshold (e.g., greater than 0.6, 0.7, 0.75, or other suitable threshold), then the landmark detection engine 302 can determine that the object is a face. The fLandmarks are the facial landmark points on the face. The facial landmark points (fLandmarks) can include a list of points. Each point in the list can include an x- and y-coordinate location within the image 301 for each landmark (e.g., a first point including an x- and y-coordinate for a first facial landmark, a second point including x- and y-coordinate for a second facial landmark, a third point including x- and y-coordinate for a third facial landmark, and so on).

The landmark detection engine 302 can provide the detected face and landmark data (e.g., the CLPSFaceData or a part of the CLPSFaceData) to the face alignment detection engine 304. The face alignment detection engine 304 can use some or all of the landmarks determined for a face to determine alignment of the face in the image 301 with respect to the camera field of view (e.g., perpendicular to the image plane of the image 301). In some examples, a facial alignment matrix can be generated for a face using the facial landmarks determined for the face. The facial alignment matrix can be used to compare an iris position with respect to facial position. For example, the facial alignment matrix can include distances from landmarks on the right side of the face to landmarks in the center of the face, and distances from landmarks on the left side of the face to landmarks in the center of the face. As described in more detail below, in the event one or both irises of a face are positioned incorrectly (e.g., with respect to the face alignment and/or with respect to the other iris), then the face alignment can be used to re-align the irises in the image 301.

For computing the face alignment of a face in the image 301, the face alignment detection engine 304 can use certain facial landmarks. In one illustrative example, the left, right, and center facial landmarks can be used by the face alignment detection engine 304 to determine the alignment of a face. For example, a distance (e.g., Euclidean distance, angular distance, or other distance) can be computed from the left landmarks to the center landmarks, and from the corresponding right landmarks to the center landmarks. In some cases, the distances can be stored in the facial alignment matrix. The average of the distances between the left landmarks and the center landmarks can be stored as a term (FL), and the average of the distances between the right landmarks and the center landmarks can be stored as the term (FR). In some examples, FL and FR can be stored in the facial alignment matrix. As described below, the terms (FL) and (FR) can be used by iris alignment detection engine 308 and/or the iris re-alignment engine 310.

Figure 5:
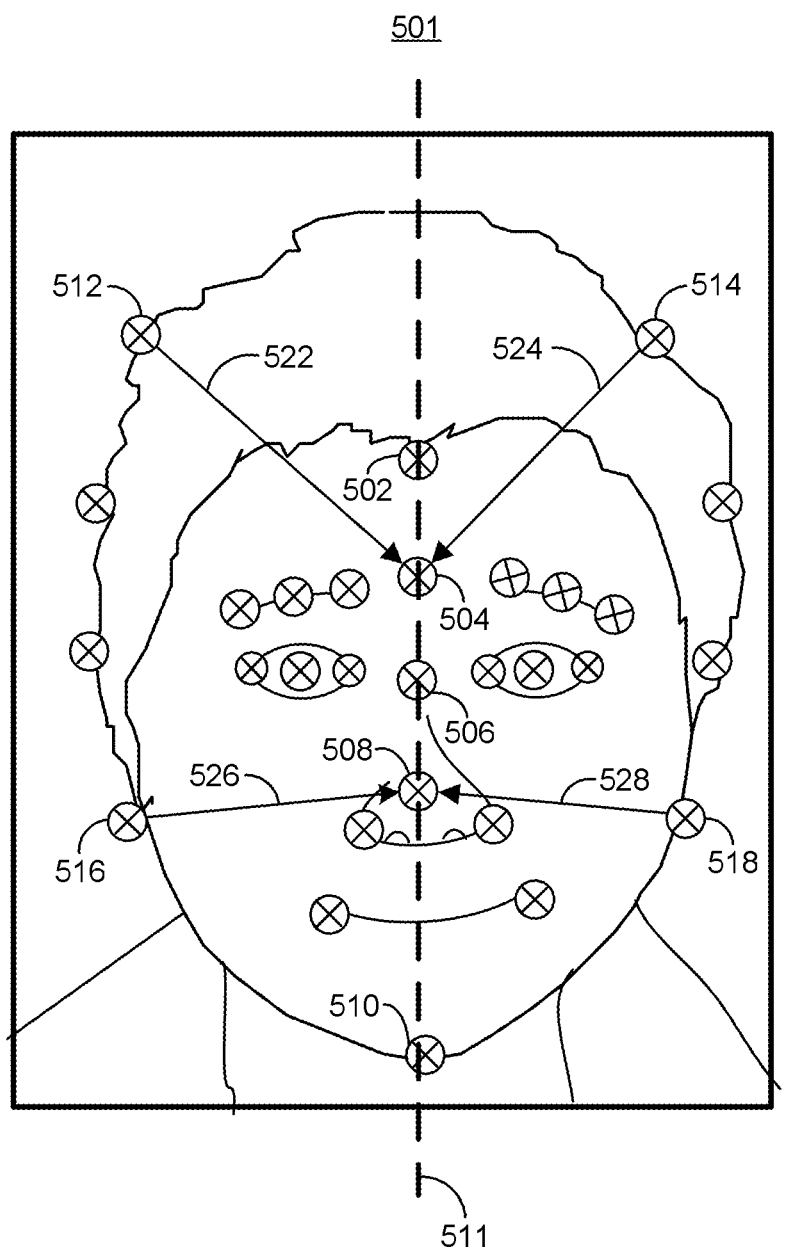
FIG. 5 is a diagram illustrating an example of determining an alignment of a face, in accordance with some examples provided herein.

FIG. 5 is an image 501 illustrating an example of determining an alignment of a face in the image. A center line 511 is shown dividing the face into a left and a right side. As used here, the left and right sides are from the perspective of the face in the image 501. Center landmarks along the center line 511 include the facial landmark 502 on the center of the forehead, the landmark 504 between the eyebrows, the landmark 506 between the eyes, the landmark 508 on tip of the nose, and the landmark 511 on the tip of the chin.

The face alignment detection engine 304 can determine a distance from each landmark on the left of the center line 511 to each of the center landmarks along the center line 511, as well as a distance from each landmark on the right of the center line 511 to each of the center landmarks. For example, a distance 522 can be determined from the landmark 512 on the right side of the face to the center landmark 504 and a distance 526 can be determined from the landmark 516 on the right side of the face to the center landmark 508. A distance can also be determined from the landmark 512 to each of the other center landmarks 502, 506, 508, and 510. Similarly, a distance can be determined from the landmark 516 to each of the other center landmarks 502, 504, 506, and 510. Distances can also be determined for some or all of the other landmarks on the right side of the face to each of the center landmarks. An average of the distances can be computed face alignment detection engine 304, and can be stored as (FR). For example, the average can be computed as:

$$FR = \frac{1}{N_R} \sum_{i=1}^{N_R} D_i \quad \text{Equation (1)}$$

where $N_R$ is the number of facial landmarks on the right side of the face being used for determining the face alignment (e.g., all facial landmarks or any suitable subset of the facial landmarks) and $D_i$ is the distance of each $i^{th}$ facial landmark on the right side of the face to each of the center landmarks. As shown in FIG. 5, for the left side of the face, a distance 524 can be determined from the landmark 514 on the left side of the face to the center landmark 504. A distance 528 can be determined from the landmark 518 on the left side of the face to the center landmark 508. A distance can also be determined from the landmark 514 to each of the other center landmarks 502, 506, 508, and 510, as well as a distance from the landmark 518 to each of the other center landmarks 502, 504, 506, and 510. Distances can also be determined for some or all of the other landmarks on the left side of the face to each of the center landmarks. An average of the distances can be computed by the face alignment detection engine 304, and can be stored as (FL) Similar to equation (1) above, the average for the left side can be computed as:

$$FL = \frac{1}{N_L} \sum_{j=1}^{N_L} D_j \quad \text{Equation (2)}$$

where $N_L$ is the number of facial landmarks on the left side of the face being used for determining the face alignment (e.g., all facial landmarks or any suitable subset of the facial landmarks) and $D_j$ is the distance of each $j^{th}$ facial landmark on the left side of the face to each of the center landmarks.

The ratio of FL/FR or FR/FL can be stored as an indication of the alignment of the face. The ratio of FL/FR will be used herein as an illustrative example. However, one of ordinary skill will understand that the ratio of FR/FL could also be used. If FL is equal to FR, in which case the ratio of FL/FR (and FR/FL) is equal to 1, the face is determined to be aligned with the camera field of view (e.g., the person is looking forward at the camera when a photograph is captured). If FR is greater than FL, in which case the average distance of the landmarks on the right side of the face is greater than the average distance of the landmarks on the left side of the face, the FL/FR ratio will be less than 1. An FL/FR ratio less than 1 indicates that the face is looking to the left, which causes the distances from the left-side landmarks to the center landmarks to be less than the distances of the right-side landmarks to the center landmarks. If FL is greater than FR, the FL/FR ratio will be greater than 1 due to the distance of the landmarks on the left side of the face being greater than the average distance of the landmarks on the right side of the face. An FL/FR ratio greater than 1 indicates that the face is looking to the right.

The landmark detection engine 302 can also provide the detected face and facial landmark data (e.g., the CLPSFaceData or a part of the CLPSFaceData) to the mask generation engine 306. The mask generation engine 306 can use one or more of the facial landmarks to generate an iris mask for each eye of each face detected in the image 301. In some examples, the iris mask includes a binary image with a first pixel value assigned to iris pixels and a second pixel value assigned to non-iris pixels (e.g., a pixel value of 1 indicates the pixel belongs to the iris and is thus an iris pixel, while a pixel value of 0 indicates the pixel does not belong to the iris and is thus a non-iris pixel). Issues can occur when generating an iris mask. For example, in some cases, an iris can be partially occluded by an eye-lid. In another example, the outer boundary colors of an iris can vary either naturally or due to environmental illumination. In another example, an iris boundary is not a perfect circle or ellipse. The iris mask generation technique implemented by the mask generation engine 306 can generate an accurate iris mask even in view of the above-noted issues.

Figure 6A:
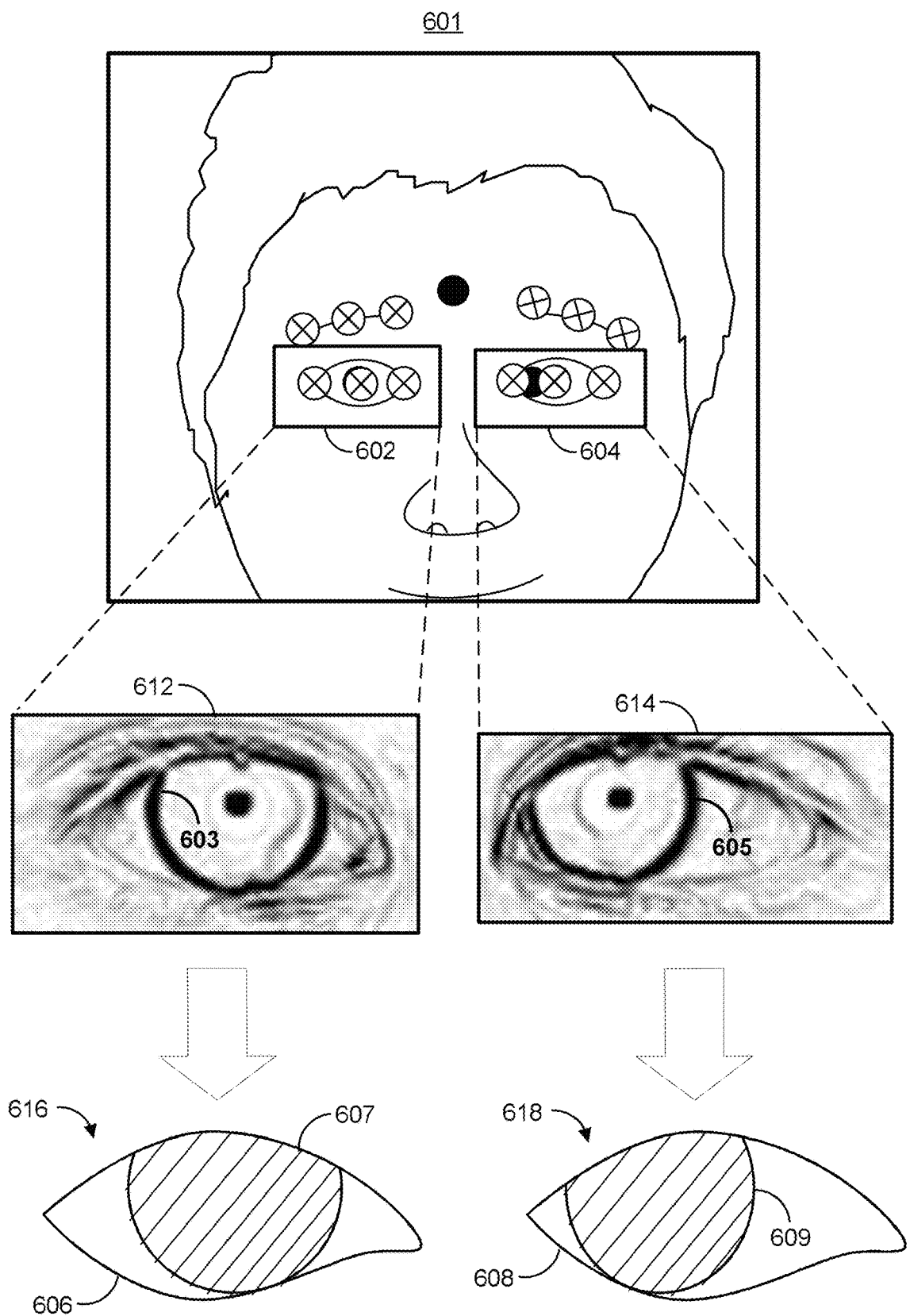
FIG. 6A is a diagram illustrating an example of generation of iris masks, in accordance with some examples provided herein.

For example, to generate iris masks for two irises of a face in the image 301, the mask generation engine 306 can perform adaptive edge detection in certain regions of the image 301 based on certain facial landmarks. The mask generation engine 306 can then classify certain pixels in the image 301 as iris pixels. FIG. 6A is a diagram illustrating an example of generation of iris masks for an image 601. The person in the image 601 has a right eye with an iris that is aligned with the face (the iris is looking directly at the camera), and a left eye with an iris that is misaligned with the face (the iris is drifted to the right of the left eye). As shown, eye landmarks in the center of each eye and on the two corners of each eye can be obtained by the mask generation engine 306 (e.g., from the CLPSFaceData), and can be used to determine a boundary around each eye. The boundary around the right eye is shown in FIG. 6A as a rectangular region 602, and the boundary around the left eye is shown as a rectangular region 604. In some cases, one or more other facial landmarks can additionally or alternatively be used to determine the boundary around each eye, such as a landmark where the eye and the top eyelid meet, a landmark where the eye and the bottom eyelid meet, one or more landmarks in the eyebrow region of the face, any combination thereof, and/or other landmarks.

The portion of the image 601 corresponding to the rectangular region 602 and the portion of the image 601 corresponding to the rectangular region 604 can be used for generation of the iris masks. In some implementations, the portions of the image 601 corresponding to the rectangular region 602 and the rectangular region 604 can be extracted (e.g., cropped or otherwise removed) from the image 601. The mask generation engine 306 can perform edge detection in the rectangular region 602 to determine the boundary 603 of the iris in the rectangular region 602. Similarly, edge detection can be performed in the rectangular region 604 to determine the boundary 605 of the iris in the rectangular region 604.

In some implementations, the mask generation engine 306 can perform adaptive edge detection in each of the rectangular regions 602 and 604. For example, to perform the adaptive edge detection, the rectangular region 602 and the rectangular region 604 can be divided into a number of blocks, and edge detection can be performed by the mask generation engine 306 separately in each of the blocks (e.g., perform edge detection in a first block of the region 602, in a second block of the region 602, and so on). In one illustrative example, the image 601 can have a resolution of 2048 pixels (width)×1536 pixels (height), and the region 602 can be 500 pixels×250 pixels. In such an illustrative example, the rectangular region 602 can be divided into blocks each having a size of 10 pixels (width)×10 pixels (height), resulting in a total of 1250 blocks (an array of 50 blocks across and 25 blocks high). Edge detection can then be performed in each of the blocks of the rectangular region 602. Performing adaptive edge detection in each of the blocks individually results in the retention of minor edges and more dominant edges. For example, if edge detection were performed in an entire rectangular region 602 or 604, the edge detection algorithm will detect only the major edges, and some of the minor edges of the eye may be missed. By dividing the rectangular region 602 and 604 images into smaller blocks, edge detection will detect edges in each block, significantly reducing or eliminating the loss of detection of minor edges.

Any edge detection algorithm can be used by the mask generation engine 306. In one illustrative example, edge detection can be performed using a Canny edge detector. The Canny edge detector is an edge detection technique that uses a multi-stage algorithm to detect a wide range of edges in images. For example, application of a Canny edge detector by the mask generation engine 306 can include applying a Gaussian filter to smooth each block of the rectangular region 602 of the image 601 in order to remove noise from each block, finding the intensity gradients of each block of the rectangular region 602, applying non-maximum suppression to get rid of spurious responses to edge detection, applying a double threshold to determine potential edges, and finalizing (e.g., using hysteresis) the detection of edges by suppressing all the other edges that are weak and not connected to strong edges. The Gaussian filter can include a Gaussian filter kernel of any suitable size (e.g., a kernel size of $(2k+1) \times (2k+1)$) that can be convolved around each block of the rectangular region 602 and each block of the rectangular region 604.

An edge image of each rectangular region can be produced with the edge detection results. For example, an edge image 612 is generated for the rectangular region 602 of the image 601, which shows the edges detected in the rectangular region 602. An edge image 614 is also generated for the rectangular region 604. The mask generation engine 306 can then classify certain pixels in each of the edge images 612 and 614 as iris pixels based on extracted features. Here, pixels belonging to a pupil portion of the eye can be considered as iris pixels.

Any suitable feature extraction technique can be used to extract the features from the edge images 612 and 614. As described below, pixels can then be classified as belonging to an iris boundary based on the extracted features. In one illustrative example, features can be extracted from the edge images 612 and 614 using Local Binary pattern (LBP). A LBP is a type of visual descriptor that can be used for classification. For example, an LBP feature vector can be generated from the edge image 612 by dividing the edge image 612 into a number of cells. In one illustrative example, each cell can have a size of 16×16 pixels. Other cell sizes can be used in other examples. For each pixel in a cell, neighboring pixels around each pixel are used to generate a binary number for each pixel. For instance, for a first pixel (referred to as a center pixel), the center pixel is compared to each of its eight neighboring pixels (including a top left neighbor, a left neighbor, bottom left neighbor, a top right neighbor, a right neighbor, and a bottom right neighbor). The value of the center pixel is compared to each of the eight neighboring pixels (e.g., in a clockwise or counter-clockwise direction). When the value of the center pixel is greater than the value of a neighboring pixel, a value of 0 can be generated and stored. When the value of the center pixel is less than the value of a neighboring pixel, a value of 1 can be generated and stored. Once all eight neighboring pixels are compared to the center pixel, an 8-digit binary number is generated (including 0 and/or 1 values). In some cases, the 8-digit binary number can be converted to decimal form. Such an analysis can be performed for each pixel in each cell of the edge image 612 and for each pixel in each cell of the edge image 614. A histogram can be computed for each cell. A histogram for a cell includes the frequency of each number (each 0 and 1) occurring in the cell. The histogram can be stored as an m-dimensional feature vector (e.g., a 256-dimensional feature vector). The histograms of all the cells in the edge image 612 can be combined (e.g., concatenated), which results in a feature vector for the entire edge image 612. A feature vector for the entire edge image 614 can also be determined by combining histograms of all the cells in the edge image 614.

Using the extracted features (e.g., the LBP feature vector for the edge image 612 and the LBP feature vector for the edge image 614), the mask generation engine 306 can classify each pixel in the edge image 612 and each pixel in the edge image 614 as a pixel belonging to an iris boundary (referred to as an iris boundary pixel) or as a pixel not belonging to an iris boundary (referred to as a non-iris boundary pixel). Any suitable classification algorithm can be used to classify the pixels, such as a support vector machine (SVM) based classifier, a K-nearest neighbor (KNN) based classifier, a neural network based image classifier, any combination thereof, and/or other type of image classification technique.

In one illustrative example, an LBP feature vector for the edge image 612 can be processed using an SVM and/or a KNN approach to classify the pixels in the edge image 612. An SVM is a supervised machine learning algorithm that can be used for classification. For example, using SVM, each data item is plotted (e.g., a pixel in the edge image, in which case each pixel value would be plotted) as a point in q-dimensional space (where q is number of features you have) with the value of each feature being the value of a particular coordinate. Classification is then performed by finding the hyperplane that differentiates the two classes by a certain amount (e.g., above a threshold distance). KNN is another machine learning-based classification technique, which can classify an unknown (unclassified) pixel as an iris boundary pixel or a non-iris boundary pixel based on k-neighboring pixels that have been previously classified. For instance, if the three closest pixels to a given pixel are all iris boundary pixels, the given pixel can be classified as an iris boundary pixel with a high confidence level. In some cases, SVM and KNN can be used together, such in a combined multi-class SVM-KNN that is a combination of SVM and KNN. For instance, SVM can be used first to identify category borders, and then KNN can be used to classify pixels among the borders. A combined SVM-KNN classification can overcome the shortcomings that might be present with using SVM or KNN as a standalone classifier, and can improve the performance of multi-class classification.

The mask generation engine 306 can generate an iris mask 616 for the right eye in the image 601 and an iris mask 618 for the left eye in the image 601. Pixels in the edge image 612 that are within the iris boundary 603 are given a first pixel value (e.g., a value of 0 corresponding to a black color, shown as hashed region 607 in FIG. 6A) in the iris mask 616 and are referred to as iris pixels (e.g., stored as A[i]). Here, pixels belonging to the pupil are considered iris pixels. Pixels in the edge image 612 that are outside of the iris boundary 603 are assigned a second pixel value (e.g., a value of 200 corresponding to gray pixels or a value of 255 corresponding to white pixels, shown as white region 606 in FIG. 6A) in the iris mask 616 and are referred to as non-iris pixels (e.g., stored as B[i]). Pixels that are not part of the eye are ignored. A similar process is performed to generate the iris mask 618, which includes iris pixels in region 609 and non-iris pixels in region 608.

Figure 6C:
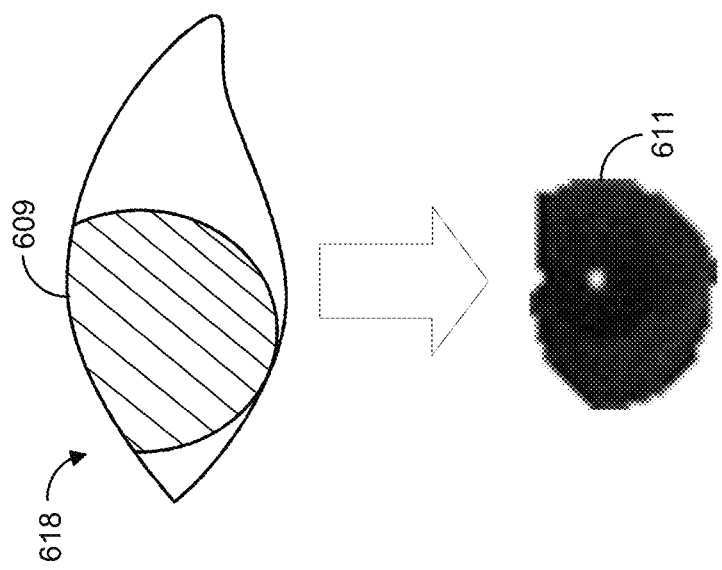
FIG. 6B and FIG. 6C are diagrams illustrating a iris portions of an image corresponding to iris portions of the iris masks generated according to FIG. 6A, in accordance with some examples provided herein.
Figure 6B:
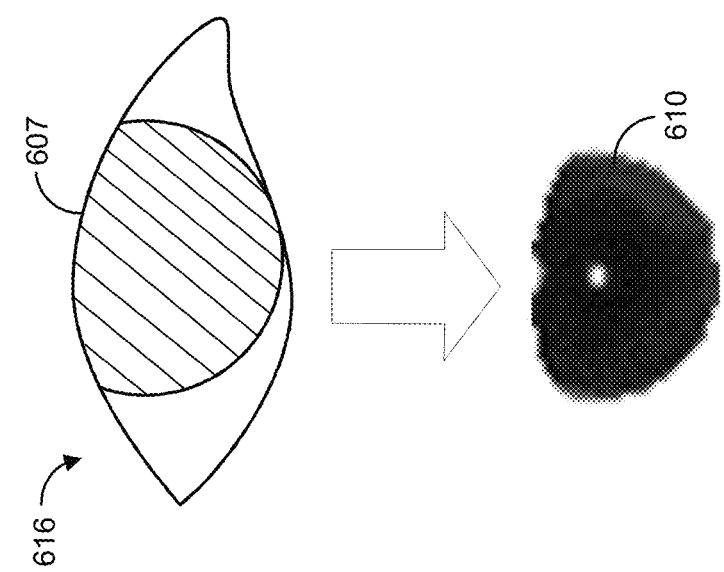

The pixels corresponding to the iris can then extracted from the image 601. For example, as shown in FIG. 6B, the iris pixels from the region 607 of the iris mask 616 can be used to identify the pixels in the image 601 that correspond to the iris (and pupil) of the right eye. The region from the image 601 corresponding to the iris of the right eye is shown in FIG. 6B as iris region 610. As shown in FIG. 6C, the iris pixels from the region 609 of the iris mask 618 can be used to identify the pixels in the image 601 that correspond to the iris (and pupil) of the left eye. The region from the image 601 corresponding to the iris of the left eye is shown in FIG. 6C as iris region 611. The iris region 610 and the iris region 611 can be used when modifying the image to adjust the locations of the right and/or left irises based on the iris alignment detection described below.

The iris alignment detection engine 308 can determine the relative alignment of each iris with respect to the face and/or with respect the other iris. In some cases, the iris masks (e.g., the iris mask 616 and the iris mask 618 from FIG. 6A-FIG. 6C) can be used to determine the alignment of the irises. The alignment of each iris can be determined by checking the ratio of the iris position between the far points of the eye (e.g., using the landmarks in the two corners of the eye) and the face alignment ratio (e.g., FL/FR or FR/FL), as follows:

Iris position ratio=$EL(1)/ER(1)$,

Face alignment ratio=$FL/FR$,

Or

Iris position ratio=$ER(1)/EL(1)$,

Face alignment ratio=$FR/FL$, where EL(1) is the distance from the left-most corner of a first eye to the left-most edge of the iris, ER(1) is the distance from the right corner of the first eye to the right edge of the iris, FL is the average of the distances between the left landmarks and the center landmarks, and FR is the average of the distances between the right landmarks and the center landmarks.

FIG. 7A is the iris mask 616 illustrating an example of the iris alignment of the right eye from the image 601 shown in FIG. 6A. As shown in FIG. 7A, EL(1) corresponds to the distance from the left corner of the right eye to the left-most edge of the iris of the right eye, and ER(1) corresponds to the distance from the right corner of the right eye to the right-most edge of the iris of the right eye. FIG. 7B is the iris mask 618 illustrating an example of the iris alignment of the left eye from the image 601 shown in FIG. 6A. As shown in FIG. 7B, EL(2) corresponds to the distance from the left corner of the left eye to the left-most edge of the iris of the left eye, and ER(2) corresponds to the distance from the right corner of the left eye to the right-most edge of the iris of the left eye. If the iris position ratio EL(1)/ER(1) for an iris is equal or close to a value of 1 (where a value of 1 is obtained when EL(1) and ER(1) are equal), the iris is at a center position within the eye (equidistant from the left and right corners of the eye). If EL(1) is greater than ER(1), the iris position ratio EL(1)/ER(1) will be large, indicating that the iris is looking toward the right.

As noted above, the iris position ratio determined for each iris can be compared to the face alignment ratio (e.g., EL(1)/ER(1) compared to FL/FR, or ER(1)/EL(1) compared to FR/FL for the iris of the right eye) to determine whether that iris is aligned with respect to the face. For example, if the iris position ratio EL(1)/ER(1) for an iris is close to (e.g., within a threshold difference, such as 0.1, 0.2, 0.5, or other value) or equal to the face alignment ratio FL/FR, the iris alignment detection engine 308 can determine the iris is aligned with the face. However, if the iris position ratio EL(1)/ER(1) for an iris deviates from the face alignment ratio FL/FR by a certain amount (e.g., greater than the threshold difference, such as 0.1, 0.2, 0.5, or other value), the iris alignment detection engine 308 can determine the iris is misaligned with respect to the alignment of the face.

In some cases, there can be three iris misalignment scenarios that can be observed, including (1) one iris is misaligned with respect to the face, (2) both irises are misaligned with respect to each other and with respect to the face, and (3) both irises are aligned with respect to each other but are misaligned with respect to the face.

In the first case where one iris is misaligned, one eye has an iris position with an alignment matching with that of the face alignment (e.g., FL/FR as determined by the face alignment detection engine 304), but the iris position of the other eye does not match with the face alignment. In such cases, the correctly-aligned eye (with the iris that is aligned with the face alignment) can be found by comparing the iris position ratio (e.g., EL(1)/ER(1)) and the face alignment ratio (e.g., FL/FR). For example, the correctly aligned eye (e.g., the right eye of the person shown in the image 601 of FIG. 6A) can be determined based on the iris position ratio of that eye matching (or being within the threshold difference from) the face alignment ratio. The misaligned eye (e.g., the left eye of the person shown in the image 601 of FIG. 6A) can be determined based on the iris position ratio of that eye being different than (or greater than the threshold difference from) the face alignment ratio. In such cases, as described below, the alignment of the face or the position of the correctly aligned eye can be used by the iris re-alignment engine 310 to reposition the misaligned eye. For example, if the correctly-aligned eye is in line with the face alignment, then in some cases the correctly-aligned iris can be used for correcting the iris of the misaligned eye. In some cases, the face alignment can be used for correcting the iris of the misaligned eye.

In the second case where both irises are misaligned with respect to each other and with respect to the face, an iris position ratio can be calculated for both irises, and the iris position ratios of the right eye and the left eye can be compared. If the iris position ratios of the two irises are different (EL(1)/ER(1) does not match with EL(2)/ER(2)), it can be determined that the eyes are misaligned with respect to one another. Also, in such cases, both the iris position ratio of the right eye and the iris position ratio of the left eye will not match with the face alignment ratio (both EL(1)/ER(1) and EL(2)/ER(2) do not match with FL/FR). In such cases, the iris re-alignment engine 310 may not rely on current positioning for either eye, but instead can generate new iris positions for both irises to match with the face alignment (e.g., FL/FR).

In the third case where both irises are aligned with respect to each other, but are misaligned with respect to the face, both iris positions are aligned in the same direction but not with respect to the face. This can happen when a user is not looking at the camera when an image is captured. The iris re-alignment engine 310 can fix such misalignment by aligning the eyes with the face alignment. For example, a new position for each iris can be determined to match with the face alignment (e.g., FL/FR).

As described above, the correct position of each misaligned iris can be determined by the iris re-alignment engine 310 based on face alignment and/or based on a position of a correctly aligned eye (which is aligned with the face alignment), and the misaligned iris can then be fixed in the input image by adjusting the iris region in the input image (e.g., the iris region 610 of the image 601 shown in FIG. 6B and/or the iris region 611 of the image 601 shown in FIG. 6C). For example, the iris position ratio for each eye currently being processed (referred to as the current eye) can be compared to the iris position ratio of the iris of the other eye and/or the face alignment ratio of the face. If the iris position ratio of the current eye and the face alignment ratio are the same or are within the threshold difference from one another, repositioning is not performed for the iris of the current eye. If the iris position ratio of the iris of the current eye is different as compared to the iris position ratio of the iris of the other eye, the iris position ratio of the current eye can be checked with respect to the face alignment ratio. The iris position ratio of an iris is checked with respect to the other iris, as opposed to only checking the alignment of the iris with respect to the face, because in the third case noted above, both irises can be aligned with respect to one another but are misaligned with respect to the face (e.g., as illustrated by the person 104 shown in FIG. 1). In such cases, the eyes are not marked as misaligned with respect to one another.

For a current eye, if the iris position ratio of the iris of the current eye is different as compared to the iris position ratio of the iris of the other eye and is also different as compared to the face alignment ratio, the iris alignment detection engine 308 can determine that the iris of the current eye is misaligned with respect to the alignment of the face and the alignment of the other iris. The iris re-alignment engine 310 can perform various steps to adjust the position of the iris of the current eye so that the misalignment is corrected. For example, the iris re-alignment engine 310 can adjust the iris region in the input image so that the iris of the current eye is in alignment with the face alignment ratio or is within the threshold difference of the face alignment ratio.

FIG. 7C illustrates an example of a modified iris mask 628 based on adjustment of the iris of the left eye of the person in the image 601. As shown, the iris pixels from the original iris mask 618 can be used to determine how much to adjust the iris region 611 in the image 601. For example, the difference between the iris position ratio of the iris and the face alignment ratio can be determined (shown in FIG. 7C as ΔL, and referred to as an adjustment amount), and the iris pixels in the iris mask 618 can be adjusted by the adjustment amount so that the iris position ratio of the iris and the face alignment ratio match or are within the threshold difference, resulting in the modified iris mask 628. As shown in FIG. 7C, the iris is moved approximately to the middle of the eye based on the adjustment of the iris by the adjustment amount (ΔL).

In some cases, before the iris region of the input image (e.g., iris region 611 of the image 601) is adjusted, the iris re-alignment engine 310 can further modify the iris mask (e.g., the modified iris mask 628) so that the iris region of the input image can be properly adjusted. In such cases, when the iris pixels in the iris mask are adjusted by the adjustment amount, pixels in the region 630 shown in FIG. 6C that were previously assigned as iris pixels, but do not belong to the iris after the iris is adjusted, can be assigned as non-iris pixels (e.g., assigned a value of 200 corresponding to gray pixels or a value of 255 corresponding to white pixels). For example, the iris re-alignment engine 310 can fill the region of the modified iris mask 628 where the iris previously was located with non-iris pixels (e.g., gray or white pixels marked as B[i], where B[i] is the portion of the iris mask not belonging to the iris and pupil).

Once the adjustment amount (e.g., ΔL in FIG. 7C) is determined, the iris re-alignment engine 310 can adjust the iris region in the input image 301 by the adjustment amount. The pixels in the input image 301 corresponding to the iris can be determined using the modified iris mask for that iris (e.g., the modified iris mask 628 shown in FIG. 7C). Referring to FIG. 6A and FIG. 6C as an example, the iris region 611 (FIG. 6C) of the image 601 (FIG. 6A), which can be identified using the iris pixels from the iris mask 618 as described above, can be adjusted by the adjustment amount so that the iris region 611 is in alignment with the face alignment ratio of the face shown in the image 601 of FIG. 6A. The pixels in the image 601 that were previously iris pixels can be modified so that they are non-iris pixels and are thus included as part of the eye that is outside of the iris. Once the one or more irises are adjusted, an output image 303 can be provided that includes the adjusted irises.

In some cases, the iris re-alignment engine 310 can determine a size for the adjusted iris. For example, a size of an adjusted iris can be determined so that the iris fits properly in the new position. The size can be modified when the original size of the iris, as depicted in the input image, does not fill the space in the center of the eye (or other portion of the eye where the iris is to be re-adjusted based on the alignment of the iris with the face). For example, there may be a case where the original iris is at a corner of the eye, and after being adjusted, the iris does not cover the required space in the portion of the eye where the iris has been adjusted (e.g., at the eye-center). In some implementations, the iris re-alignment engine 310 can determine the size of the adjusted iris by measuring the best fitting inner ellipse at the new location (e.g., based on the alignment of the iris with the face) and checking whether the left eye iris or the right eye iris has a size that matches the ellipse. For example, the other iris (other than the iris being adjusted) can be checked to determine if it is a better fit than the iris being adjusted. The iris region (e.g., iris region 610 or iris region 611) of the iris that best fits the ellipse (e.g., is closest in size to the ellipse) can be pasted in the new position in the input image (e.g., image 601) with the center of the iris maintained. In some implementations, if neither iris fully fills the space in the new location for the iris being adjusted, the iris that is a closest fit to the ellipse can be pasted in the new position, and can be scaled to a larger size so that the iris fills the space. Using the iris that more closely fills the space can reduce the amount of scaling needed when adjusting the iris region in the input image.

FIG. 8 includes images 801 and 803 illustrating a result of applying the above-described eye correction process. The eye correction process is applied to the image 801 of a person with a left eye 804 looking in a different direction than the right eye 802 and that is misaligned with respect to the face of the person. As shown in the image 803, the iris portion of the image 803 corresponding to the iris of the left eye 804 is adjusted so that it aligns with the alignment of the face and/or with the alignment of the right eye 802.

Figure 9:
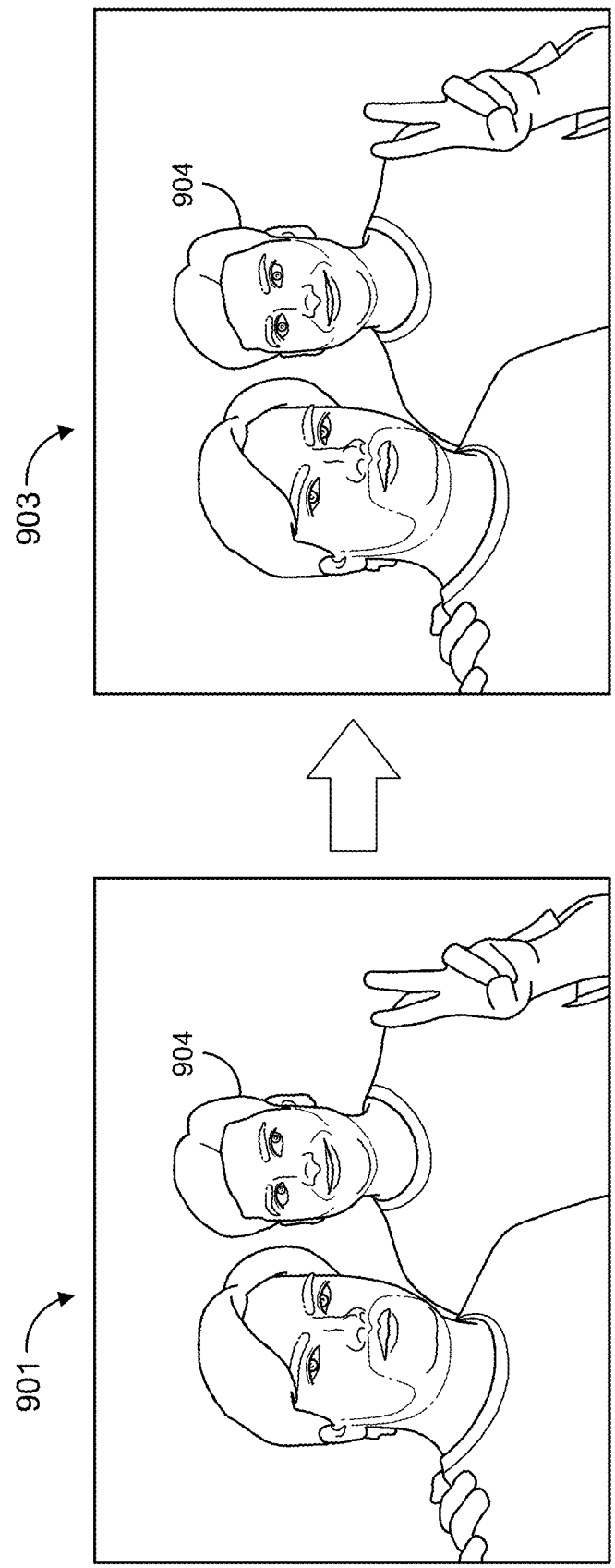
FIG. 9 are images illustrating a result of applying eye correction to an image of a person looking away from a camera as a photograph is captured, in accordance with some examples provided herein.

For a current eye, if the iris position ratio is the same with respect to the iris of the other eye, but is different than the face alignment ratio or greater than the threshold difference (which can occur, for example, when user is not looking towards camera when an image is captured, as shown in FIG. 1), the iris positioning of both eyes can be corrected and aligned with respect to the face (e.g., aligned to match with the face alignment ratio). To fix the misalignment of both eyes, the above-described steps can be performed for each iris. FIG. 9 includes images 901 and 903 illustrating a result of applying the above-described eye correction process. The eye correction process is applied to the image 901 of a person looking away from a camera as an image 901 is captured. As a result, the irises of the person's eyes are aligned with one another, but are misaligned with respect to the face of the person. As shown in the image 903, the iris portions of the image 903 corresponding to the irises of both eyes are adjusted so that they are aligned with the alignment of the face.

Figure 10:
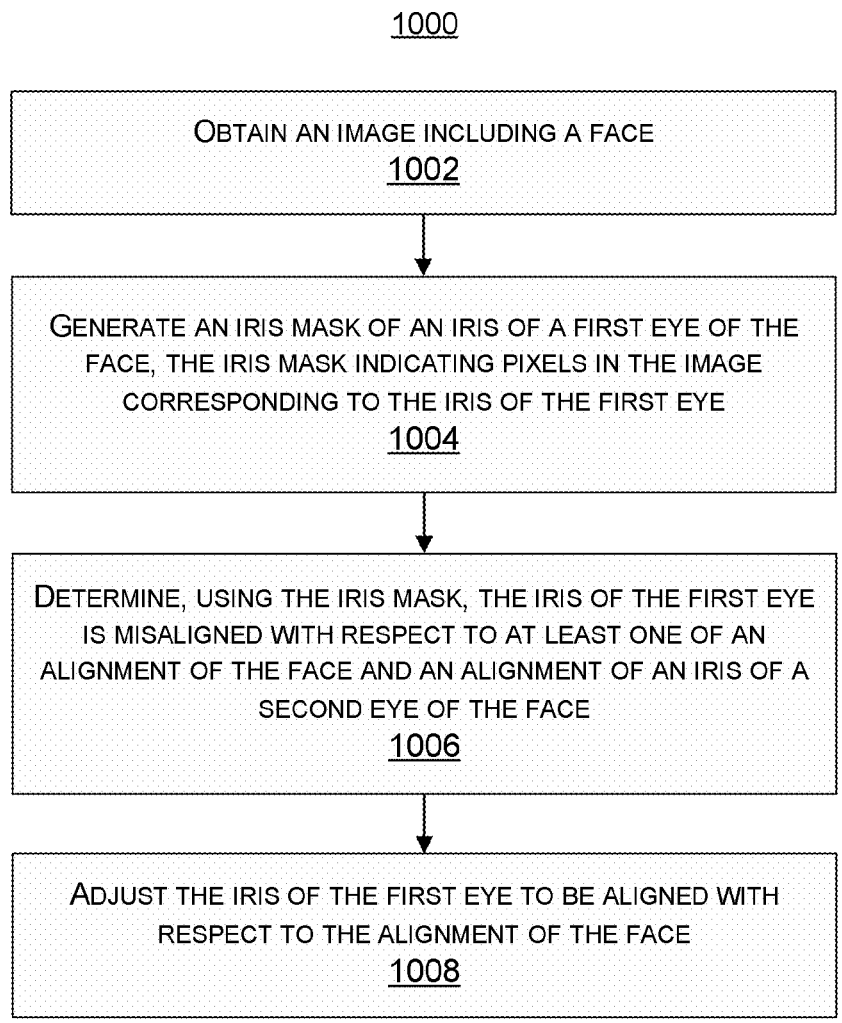
FIG. 10 is a flowchart illustrating an example of a process of processing one or more images, in accordance with some examples provided herein.

An example of a process performed using the techniques described herein will now be described. FIG. 10 is a flowchart illustrating an example of a process 800 for processing one or more images. At block 1002, the process 1000 includes obtaining an image including a face. In one illustrative example, the image can include the image 601 shown in FIG. 6A.

At block 1004, the process 1000 includes generating an iris mask of an iris of a first eye of the face, the iris mask indicating pixels in the image corresponding to the iris of the first eye. For example, the process 1000 can include determining at least one facial landmark of the face in the image. The at least one facial landmark corresponds to the first eye of the face. The process 1000 can also include determining, using the at least one facial landmark, a portion of the image including the first eye. For example, as described above with respect to FIG. 6A, eye landmarks in the center of each eye and on the two corners of each eye can be obtained (e.g., by the mask generation engine 306), and can be used to determine a boundary around each eye (e.g., as a rectangular region 602 around the right eye, and as a rectangular region 604 around the left eye). Other facial landmarks can also be used, such as a landmark where the eye and the top eyelid meet, a landmark where the eye and the bottom eyelid meet, one or more landmarks in the eyebrow region of the face, among others facial landmarks.

The process 1000 can include generating the iris mask of the iris of the first eye based on edge detection and classification performed for the portion of the image. In some implementations, the process 1000 can perform adaptive edge detection including dividing the portion of the image into a plurality of blocks, and performing the edge detection in each block of the plurality of blocks. The process 1000 can also include generating, based on the edge detection, a binary image of the portion of the image. The process 1000 can include classifying a first set of pixels in the binary image as iris pixels and a second set of pixels in the binary image as non-iris pixels. The iris mask includes a first value for the iris pixels and a second value for the non-iris pixels. For example, a pixel value of 1 can be used to indicate that a pixel is an iris pixel belonging to the iris, and a pixel value of 0 can be used to indicate that a pixel is a non-iris pixel that does not belong to the iris.

At block 1006, the process 1000 includes determining, using the iris mask, the iris of the first eye is misaligned with respect to at least one of an alignment of the face and an alignment of an iris of a second eye of the face. In some examples, as described above, an iris can be determined to be misaligned with respect to the alignment of the face by comparing the iris position ration (e.g., EL(1)/ER(1) or EL(2)/ER(2)) to the face alignment ratio (e.g., FL/FR). For example, the process 1000 can include determining an alignment of the iris of the first eye. Determining the alignment of the iris of the first eye can include determining a first distance (e.g., ER(2) in FIG. 7B) between a right edge of the iris of the first eye and a right edge of the first eye, and determining a second distance (e.g., EL(2) in FIG. 7B) between a left edge of the iris of the first eye and a left edge of the first eye. The process 1000 can include comparing the first distance to the second distance, and determining, based on comparing the first distance to the second distance, the alignment of the iris of the first eye. For instance, a comparison or ratio of EL(2)/ER(2) can be calculated to determine the alignment of the iris within the eye (referred to above as the iris position ratio).

In some examples, the process 1000 can include determining a plurality of facial landmarks of the face in the image, and determining the alignment of the face using the plurality of facial landmarks. For instance, the process 1000 can include determining the plurality of facial landmarks of the face in the image. The plurality of facial landmarks can include one or more left facial landmarks, one or more right facial landmarks, and one or more center facial landmarks (e.g., as shown in FIG. 5). The process 1000 can include determining at least a first distance between a first left facial landmark of the one or more left facial landmarks and a first center facial landmark of the one or more center facial landmarks, and determining at least a second distance between a first right facial landmark of the one or more right facial landmarks and the first center facial landmark. In some examples, a distance (e.g., Euclidean distance, angular distance, or other distance) can be computed from the left landmarks to the center landmarks, and from the corresponding right landmarks to the center landmarks, an average of the distances between the left landmarks and the center landmarks can be determined and in some cases stored (e.g., as a term (FL)), and an average of the distances between the right landmarks and the center landmarks can be determined and in some cases stored (e.g., as the term (FR)). The process 1000 can include determining the alignment of the face based on at least the first distance at least the second distance. For example, the ratio of FL/FR or FR/FL can be stored as an indication of the alignment of the face.

At block 1008, the process 1000 includes adjusting the iris of the first eye to be aligned with respect to the alignment of the face. In some examples, a correctly-aligned iris can be used to correct a misaligned iris, such as if the correctly-aligned eye is in line with the face alignment.

In some cases, the face alignment can be used for correcting the iris of the misaligned eye even when there is a correctly-aligned eye that is in line with the face alignment. In some examples, adjusting the iris of the first eye can include adjusting a position of the iris and a size of the iris. In some examples, adjust the iris of the first eye can include adjusting only a position of the iris.

In one illustrative example, the process 1000 can include determining the iris of the first eye is misaligned with respect to the alignment of the face and is misaligned with respect to the alignment of the iris of the second eye of the face (e.g., when the user has one crossed eye). The process 1000 can include determining the iris of the second eye is aligned with respect to the alignment of the face, and adjusting the iris of the first eye based on the alignment of the face. The iris can be adjusted using the techniques described above with respect to at least FIG. 7A-FIG. 7C.

In another illustrative example, the process 1000 can include determining the iris of the first eye is misaligned with respect to the alignment of the face and is misaligned with respect to the alignment of the iris of the second eye. The process 1000 can also include determining the iris of the second eye is misaligned with respect to the alignment of the face, and adjusting the iris of the first eye and the iris of the second eye based on the alignment of the face. The iris can be adjusted using the techniques described above with respect to at least FIG. 7A-FIG. 7C.

In another illustrative example, the process 1000 can include determining the iris of the first eye is aligned with respect to the alignment of the iris of the second eye and is misaligned with respect to the alignment of the face. The process 1000 can also include determining the iris of the second eye is misaligned with respect to the alignment of the face, and adjusting the iris of the first eye and the iris of the second eye based on the alignment of the face. The iris can be adjusted using the techniques described above with respect to at least FIG. 7A-FIG. 7C.

Figure 11:
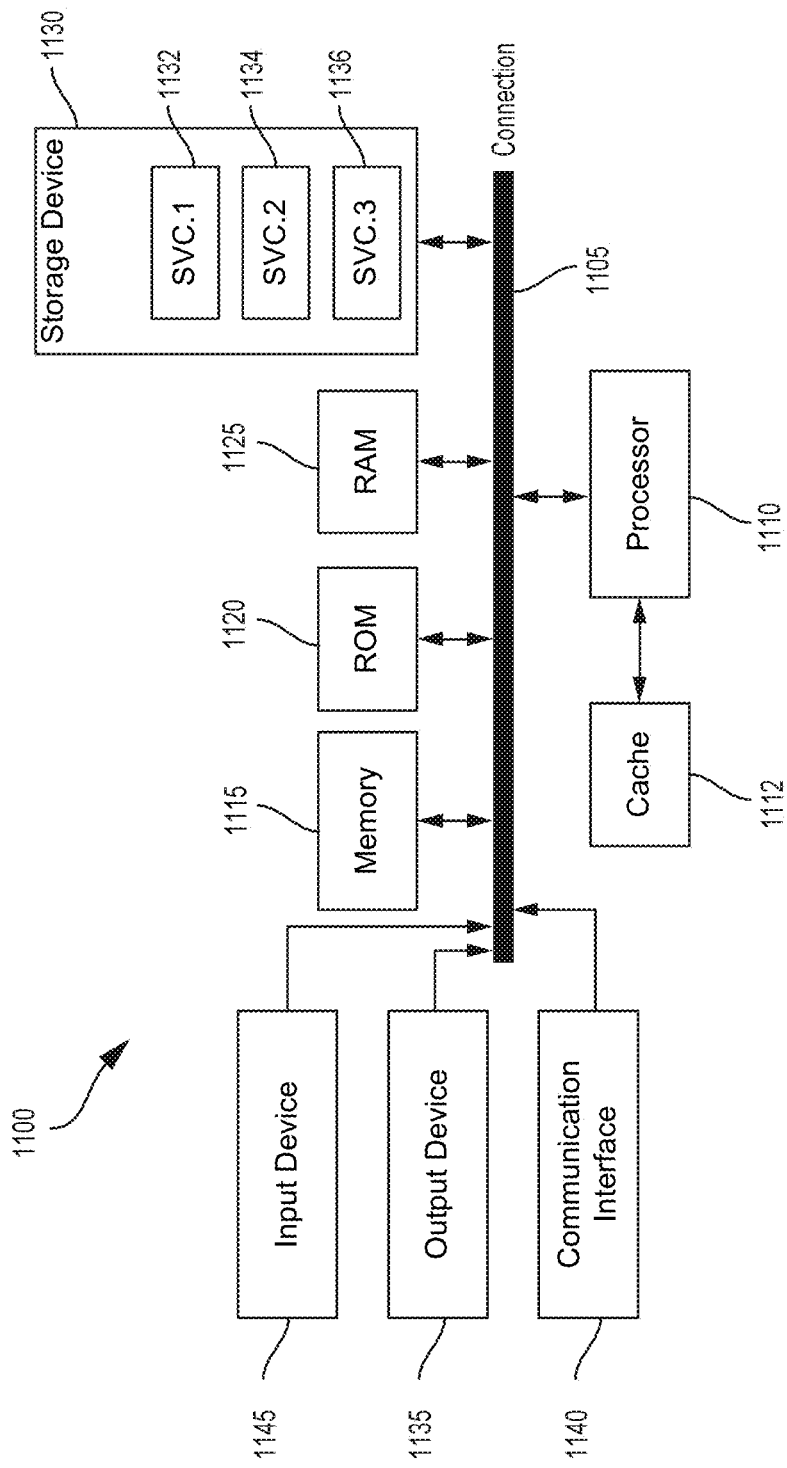
FIG. 11 is an example computing device architecture of an example computing device that can implement the various techniques described herein.

In some examples, the process 1000 may be performed by a computing device or apparatus, such as a computing device having the computing device architecture 1100 shown in FIG. 11. In one example, the process 1000 can be performed by a computing device with the computing device architecture 1100 implementing the eye correction system 300 shown in FIG. 3. In some cases, the computing device or apparatus may include an input device, a landmark detection engine, a face alignment detection engine, a mask generation engine, an iris alignment detection engine, an iris re-alignment engine, an output device, one or more processors, one or more microprocessors, one or more microcomputers, and/or other component(s) that is/are configured to carry out the steps of process 1000. The components of the computing device (e.g., the one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

Process 1000 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1000 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 11 illustrates an example computing device architecture 1100 of an example computing device which can implement the various techniques described herein. For example, the computing device architecture 1100 can implement the eye correction system 300 shown in FIG. 3. The components of computing device architecture 1100 are shown in electrical communication with each other using connection 1105, such as a bus. The example computing device architecture 1100 includes a processing unit (CPU or processor) 1110 and computing device connection 1105 that couples various computing device components including computing device memory 1115, such as read only memory (ROM) 1120 and random access memory (RAM) 1125, to processor 1110.

Computing device architecture 1100 can include a cache of high-speed memory connected directly with, in close proximity to, or integrated as part of processor 1110. Computing device architecture 1100 can copy data from memory 1115 and/or the storage device 1130 to cache 1112 for quick access by processor 1110. In this way, the cache can provide a performance boost that avoids processor 1110 delays while waiting for data. These and other modules can control or be configured to control processor 1110 to perform various actions. Other computing device memory 1115 may be available for use as well. Memory 1115 can include multiple different types of memory with different performance characteristics. Processor 1110 can include any general purpose processor and a hardware or software service, such as service 1 1132, service 2 1134, and service 3 1136 stored in storage device 1130, configured to control processor 1110 as well as a special-purpose processor where software instructions are incorporated into the processor design. Processor 1110 may be a self-contained system, containing multiple cores or processors, a bus, memory controller, cache, etc. A multi-core processor may be symmetric or asymmetric.

To enable user interaction with the computing device architecture 1100, input device 1145 can represent any number of input mechanisms, such as a microphone for speech, a touch-sensitive screen for gesture or graphical input, keyboard, mouse, motion input, speech and so forth. Output device 1135 can also be one or more of a number of output mechanisms known to those of skill in the art, such as a display, projector, television, speaker device, etc. In some instances, multimodal computing devices can enable a user to provide multiple types of input to communicate with computing device architecture 1100. Communications interface 1140 can generally govern and manage the user input and computing device output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof. Storage device 1130 can include services 1132, 1134, 1136 for controlling processor 1110. Other hardware or software modules are contemplated. Storage device 1130 can be connected to the computing device connection 1105. In one aspect, a hardware module that performs a particular function can include the software component stored in a computer-readable medium in connection with the necessary hardware components, such as processor 1110, connection 1105, output device 1135, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method of processing one or more images, comprising:
    obtaining an image including a face;
    generating an iris mask of an iris of a first eye of the face, the iris mask indicating pixels in the image corresponding to the iris of the first eye;
    determining, using the iris mask, the iris of the first eye is misaligned with respect to at least one of an alignment of the face and an alignment of an iris of a second eye of the face; and
    adjusting the iris of the first eye to be aligned with respect to the alignment of the face.

2. The method of claim 1, further comprising:
    determining at least one facial landmark of the face in the image, the at least one facial landmark corresponding to the first eye of the face;
    determining, using the at least one facial landmark, a portion of the image including the first eye; and
    generating the iris mask of the iris of the first eye based on edge detection and classification performed for the portion of the image.

3. The method of claim 2, further comprising:
    dividing the portion of the image into a plurality of blocks;
    performing the edge detection in each block of the plurality of blocks;
    generating, based on the edge detection, a binary image of the portion of the image; and
    classifying a first set of pixels in the binary image as iris pixels and a second set of pixels in the binary image as non-iris pixels, wherein the iris mask includes a first value for the iris pixels and a second value for the non-iris pixels.

4. The method of claim 1, further comprising:
    determining the iris of the first eye is misaligned with respect to the alignment of the face and is misaligned with respect to the alignment of the iris of the second eye;
    determining the iris of the second eye is aligned with respect to the alignment of the face; and
    adjusting the iris of the first eye based on the alignment of the face.

5. The method of claim 1, further comprising:
    determining the iris of the first eye is misaligned with respect to the alignment of the face and is misaligned with respect to the alignment of the iris of the second eye;
    determining the iris of the second eye is misaligned with respect to the alignment of the face; and
    adjusting the iris of the first eye and the iris of the second eye based on the alignment of the face.

6. The method of claim 1, further comprising:
    determining the iris of the first eye is aligned with respect to the alignment of the iris of the second eye and is misaligned with respect to the alignment of the face;
    determining the iris of the second eye is misaligned with respect to the alignment of the face; and
    adjusting the iris of the first eye and the iris of the second eye based on the alignment of the face.

7. The method of claim 1, wherein adjusting the iris of the first eye includes adjusting a position of the iris and a size of the iris.

8. The method of claim 1, further comprising determining an alignment of the iris of the first eye, including:
    determining a first distance between a right edge of the iris of the first eye and a right edge of the first eye;
    determining a second distance between a left edge of the iris of the first eye and a left edge of the first eye;
    comparing the first distance to the second distance; and
    determining, based on comparing the first distance to the second distance, the alignment of the iris of the first eye.

9. The method of claim 1, further comprising:
    determining a plurality of facial landmarks of the face in the image; and
    determining the alignment of the face using the plurality of facial landmarks.

10. The method of claim 1, further comprising:
    determining a plurality of facial landmarks of the face in the image, the plurality of facial landmarks including one or more left facial landmarks, one or more right facial landmarks, and one or more center facial landmarks;
    determining at least a first distance between a first left facial landmark of the one or more left facial landmarks and a first center facial landmark of the one or more center facial landmarks;
    determining at least a second distance between a first right facial landmark of the one or more right facial landmarks and the first center facial landmark; and
    determining the alignment of the face based on at least the first distance at least the second distance.

11. A system for processing one or more images, comprising:
    an input device configured to obtain an image including a face;
    a mask generation engine configured to generate an iris mask of an iris of a first eye of the face, the iris mask indicating pixels in the image corresponding to the iris of the first eye;
    an iris alignment detection engine configured to determine, using the iris mask, the iris of the first eye is misaligned with respect to at least one of an alignment of the face and an alignment of an iris of a second eye of the face; and
    an iris re-alignment engine configured to adjust the iris of the first eye to be aligned with respect to the alignment of the face.

12. The system of claim 11, further comprising:
    a landmark detection engine configured to determine at least one facial landmark of the face in the image, the at least one facial landmark corresponding to the first eye of the face; and
    wherein the mask generation engine is configured to determine, using the at least one facial landmark, a portion of the image including the first eye and to generate the iris mask of the iris of the first eye based on edge detection and classification performed for the portion of the image.

13. The system of claim 12, wherein the mask generation engine is configured to:
    divide the portion of the image into a plurality of blocks;
    perform the edge detection in each block of the plurality of blocks;

generate, based on the edge detection, a binary image of the portion of the image; and classify a first set of pixels in the binary image as iris pixels and a second set of pixels in the binary image as non-iris pixels, wherein the iris mask includes a first value for the iris pixels and a second value for the non-iris pixels.

14. The system of claim 11, wherein:

the iris alignment detection engine is configured to:
  determine the iris of the first eye is misaligned with respect to the alignment of the face and is misaligned with respect to the alignment of the iris of the second eye; and
  determine the iris of the second eye is aligned with respect to the alignment of the face; and the iris re-alignment engine is configured to adjusting the iris of the first eye based on the alignment of the face.

15. The system of claim 11, wherein:

the iris alignment detection engine is configured to:
  determine the iris of the first eye is misaligned with respect to the alignment of the face and is misaligned with respect to the alignment of the iris of the second eye; and
  determine the iris of the second eye is misaligned with respect to the alignment of the face; and the iris re-alignment engine is configured to adjust the iris of the first eye and the iris of the second eye based on the alignment of the face.

16. The system of claim 11, wherein:

the iris alignment detection engine is configured to:
  determine the iris of the first eye is aligned with respect to the alignment of the iris of the second eye and is misaligned with respect to the alignment of the face; and
  determine the iris of the second eye is misaligned with respect to the alignment of the face; and the iris re-alignment engine is configured to adjust the iris of the first eye and the iris of the second eye based on the alignment of the face.

17. The system of claim 11, wherein adjusting the iris of the first eye includes adjusting a position of the iris and a size of the iris.

18. The system of claim 11, wherein the iris alignment detection engine is configured to determine an alignment of the iris of the first eye, including:
  determining a first distance between a right edge of the iris of the first eye and a right edge of the first eye;
  determining a second distance between a left edge of the iris of the first eye and a left edge of the first eye;
  comparing the first distance to the second distance; and
  determining, based on comparing the first distance to the second distance, the alignment of the iris of the first eye.

19. The system of claim 11, further comprising a face alignment detection engine configured to:
  determine a plurality of facial landmarks of the face in the image; and
  determine the alignment of the face using the plurality of facial landmarks.

20. A non-transitory computer-readable medium having stored thereon instructions that, when executed by one or more processors, cause the one or more processors to:
  obtain an image including a face;
  generate an iris mask of an iris of a first eye of the face, the iris mask indicating pixels in the image corresponding to the iris of the first eye;
  determine, using the iris mask, the iris of the first eye is misaligned with respect to at least one of an alignment of the face and an alignment of an iris of a second eye of the face; and
  adjust the iris of the first eye to be aligned with respect to the alignment of the face.

* * * * *